United States Patent
Liu et al.

(10) Patent No.: US 7,706,592 B2
(45) Date of Patent: Apr. 27, 2010

(54) METHOD FOR DETECTING A BOUNDARY OF A MONETARY BANKNOTE WITHIN AN IMAGE

(75) Inventors: Xu-Hua Liu, Los Angeles, CA (US);
Byung-Tae Oh, Los Angeles, CA (US);
Young-Min Kwak, Gardena, CA (US);
Chung-Chieh Kuo, Taipei (TW);
Ying-Jieh Huang, Taipei County (TW)

(73) Assignee: Primax Electronics Ltd., Neihu, Taipei (TW)

(*) Notice: Subject to any disclaimer, the term of this patent is extended or adjusted under 35 U.S.C. 154(b) by 875 days.

(21) Appl. No.: 11/533,371

(22) Filed: Sep. 20, 2006

(65) Prior Publication Data

US 2008/0069425 A1  Mar. 20, 2008

(51) Int. Cl.
*G06K 9/00* (2006.01)
(52) U.S. Cl. ...................................... 382/135
(58) Field of Classification Search ............... 382/135, 382/165, 190, 199, 219, 289
See application file for complete search history.

(56) References Cited

U.S. PATENT DOCUMENTS

| | | | |
|---|---|---|---|
| 5,533,144 A | 7/1996 | Fan | |
| 5,638,496 A | 6/1997 | Sato | |
| 6,026,186 A | 2/2000 | Fan | |
| 6,067,374 A | 5/2000 | Fan et al. | |
| 6,181,813 B1* | 1/2001 | Fan et al. | 382/135 |
| 6,256,412 B1 | 7/2001 | Miyazawa et al. | |
| 6,317,524 B1 | 11/2001 | Wu et al. | |
| 6,343,204 B1 | 1/2002 | Yang | |
| 6,473,202 B1 | 10/2002 | Kanata | |
| 6,515,764 B1 | 2/2003 | Knox et al. | |
| 6,516,078 B1 | 2/2003 | Yang et al. | |
| 6,542,629 B1 | 4/2003 | Wu et al. | |
| 6,574,366 B1 | 6/2003 | Fan | |
| 6,580,820 B1 | 6/2003 | Fan | |
| 6,731,784 B2 | 5/2004 | Yang | |
| RE38,716 E | 3/2005 | Caspi | |
| 2002/0146167 A1 | 10/2002 | Imamura | |
| 2004/0247169 A1 | 12/2004 | Ross | |
| 2005/0100204 A1* | 5/2005 | Afzal et al. | 382/135 |

\* cited by examiner

*Primary Examiner*—Charles Kim
*Assistant Examiner*—Claire Wang
(74) *Attorney, Agent, or Firm*—Winston Hsu

(57) ABSTRACT

A method for detecting a boundary of a monetary banknote within an image includes dividing the image into a plurality of sections; generating a color feature map containing color histogram data for each section of the image; generating a gray level feature map indicating a gray level value for each section of the image; recording border sections onto a banknote boundary map, the border sections being sections having color histogram data within a first predetermined range and gray level values within a second predetermined range; removing internal border sections enclosed by perimeter border sections from the banknote boundary map; and dilating the perimeter border sections on the banknote boundary map.

9 Claims, 10 Drawing Sheets

METHOD FOR DETECTING A BOUNDARY OF A MONETARY BANKNOTE WITHIN AN IMAGE

BACKGROUND OF THE INVENTION

1. Field of the Invention

The present invention relates to image processing, more particularly, a method for detecting a boundary of a monetary banknote within an image.

2. Description of the Prior Art

Advancements in image processing systems, including digital color copiers, scanners, and small scale printing presses, has also lead to reproduction of monetary banknotes, currencies, stocks, bonds, and other irreproducible documents by counterfeiters. Obviously illegal, criminals participate in such activities for personal gain or profit.

Because of the presence of such counterfeit and copied items, there is a need to be able to effectively discern and distinguish such fake items from valid and authentic ones. This task however, becomes increasingly difficult as printing and reproduction advancements allow counterfeiters to reproduce copies that are virtually indistinguishable to the human eye.

One aspect of counterfeit currency detection involves identifying a boundary of a monetary banknote. FIG. 1 shows a monetary banknote 110 according to the prior art. Note that the banknote 110 can be separated into two main sections: the banknote boundary 120 and the banknote main body 130. It is therefore important to be able to identify the banknote boundary 120, because once identified, currency verification processes can take place within the banknote main body 130. The banknote main body 130 generally contains more distinguishable features, such as landmarks, holograms, colors, and texture patterns, where more secure counterfeit identification processes can occur. Also, distinguishing the banknote boundary 120 will allow different banknotes to be separated in the case they are overlapping, or if several banknotes are contained within the same scanned image.

Additionally, if the banknote is scanned while embedded in a complicated image background, it may be more difficult to distinguish the actual note from the image background. The image background may also provide additional noise and/or patterns to complicate the detection process and introduce irregularities and errors. Also, variations in the shift, rotation and alignment of the banknote may complicate identification processes. Therefore in these conditions, identification of the banknote boundary is crucial to avoid errors in counterfeit detection.

SUMMARY OF THE INVENTION

One objective of the claimed invention is therefore to provide a method for detecting a boundary of a monetary banknote within an image, to solve the above-mentioned problems.

According to an exemplary embodiment of the claimed invention, a method for detecting a boundary of a monetary banknote within an image is disclosed. The method comprises: dividing the image into a plurality of sections; generating a color feature map containing color histogram data for each section of the image; generating a gray level feature map indicating a gray level value for each section of the image; recording border sections onto a banknote boundary map, the border sections being sections having color histogram data within a first predetermined range and gray levels within a second predetermined range; removing internal border sections enclosed by perimeter border sections from the banknote boundary map; and dilating the perimeter border sections on the banknote boundary map.

These and other objectives of the present invention will no doubt become obvious to those of ordinary skill in the art after reading the following detailed description of the preferred embodiment that is illustrated in the various figures and drawings.

DETAILED DESCRIPTION

In order to aid in the detection and verification of monetary banknotes, the present invention provides a method for detecting a boundary of a monetary banknote within an image. The method can be applied for use in the detection of counterfeit currency. An image, containing a scan of the banknote, can be provided with an arbitrary rotational axis and shift alignment for banknote boundary detection. Additionally, the image can contain the monetary banknote while superimposed onto an arbitrary background, can include multiple isolated and independent banknotes, or have overlapping banknotes within the image. The method can be used in conjunction with basic stand-alone scanners, copiers, stand-alone printers, and other related detection and scanning hardware.

Detection of a banknote boundary will allow for the separation of multiple banknotes when on the same image scan. This will also help distinguish multiple banknotes if they are found overlapping. Once the banknote boundary is detected, banknote verification techniques can be applied to the banknote main body, as it typically contains more distinguishing features which can be used in banknote verification processes.

Figure 2:
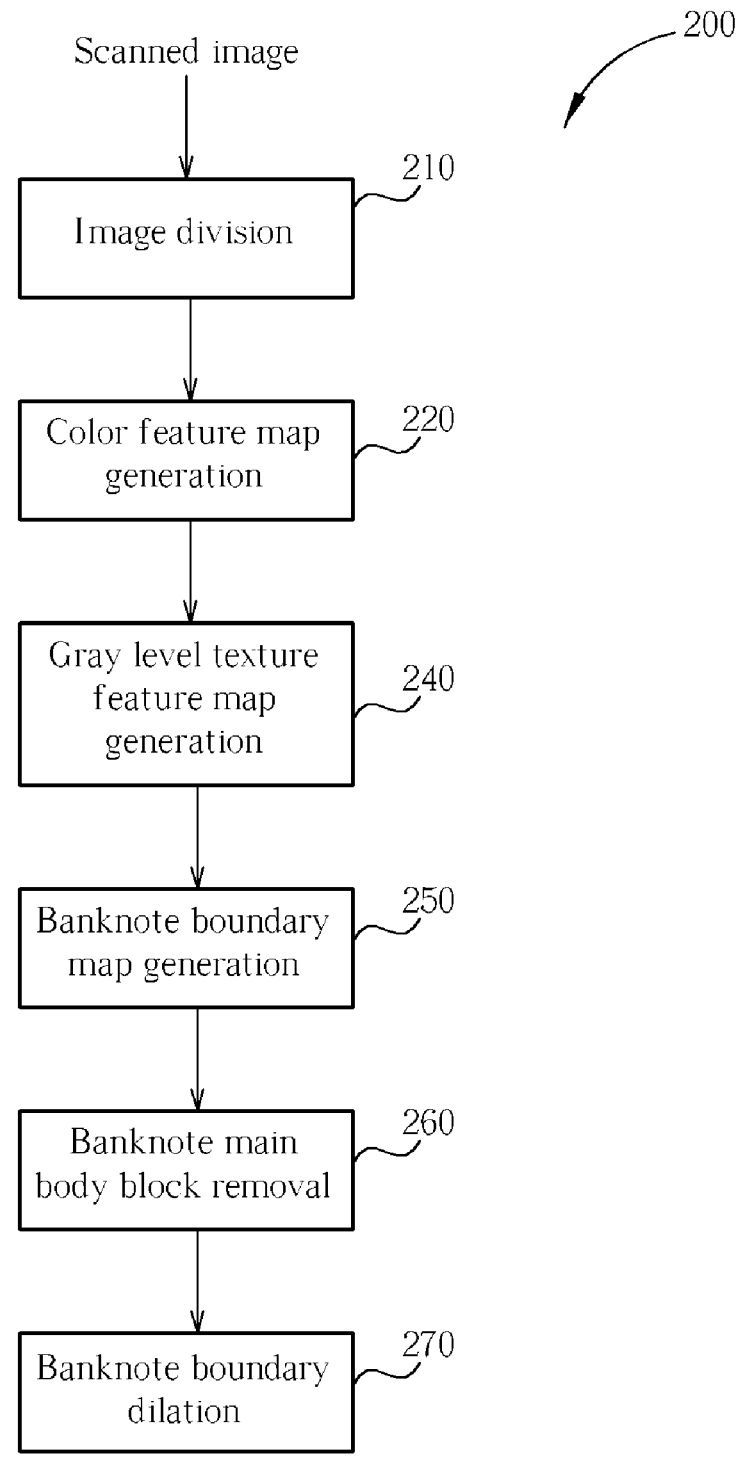
FIG. 2 is an overview of a banknote boundary detection method according to an exemplary embodiment of the present invention.

An overview of the method for detecting a boundary of a monetary banknote within an image is provided with reference to FIG. 2. A digitally scanned image is first received. Image division 210 then occurs, where the image is divided into a plurality of sections. Color feature map generation 220 then follows, where a color feature map is created containing color histogram data for each section of the image. The next step is gray level texture feature map generation 240, where a gray level texture feature map is created to indicate a gray level value for each section of the image. Banknote boundary map generation 250 follows, where border sections are recorded onto a banknote boundary map. The border sections are chosen from sections having color histogram data within a first predetermined range and gray levels within a second predetermined range. The internal border sections enclosed by perimeter border sections are then removed from the banknote boundary map in the banknote main body block removal 260 step. Finally, perimeter border sections are dilated on the banknote boundary map in the banknote boundary dilation 270 step.

Although a general process overview is already provided above, further detail of each relevant section is provided below.

Figure 3:
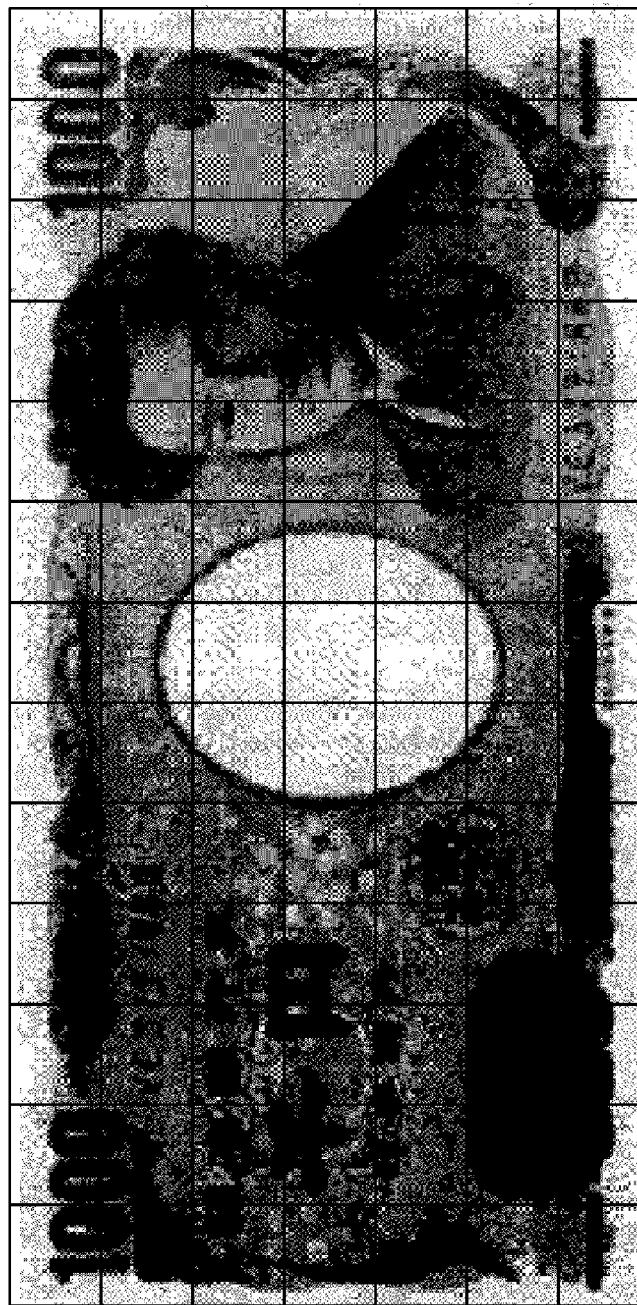
FIG. 3 illustrates an input image divided into sections when utilizing the method of FIG. 2.

During image division 210, the received image is divided into a plurality of sections. FIG. 3 is an example of an input image (monetary banknote) divided into sections. The division of the input image into sections allows for increased computational efficiency in overall processing of the banknote, as each section can be processed individually. The sections can be arbitrarily shaped as blocks, or any other configuration so long as the teachings of the present invention are maintained. Additionally, the sections can be arranged in an overlapping manner, as shown in the example illustrated in FIG. 4 (represented by the solid lines, and overlapping dashed lines). The exact configuration of overlapping is arbitrary, and may vary according to different embodiments. The overlapping of sections provides a greater resolution for the processing of each section.

Figure 5:
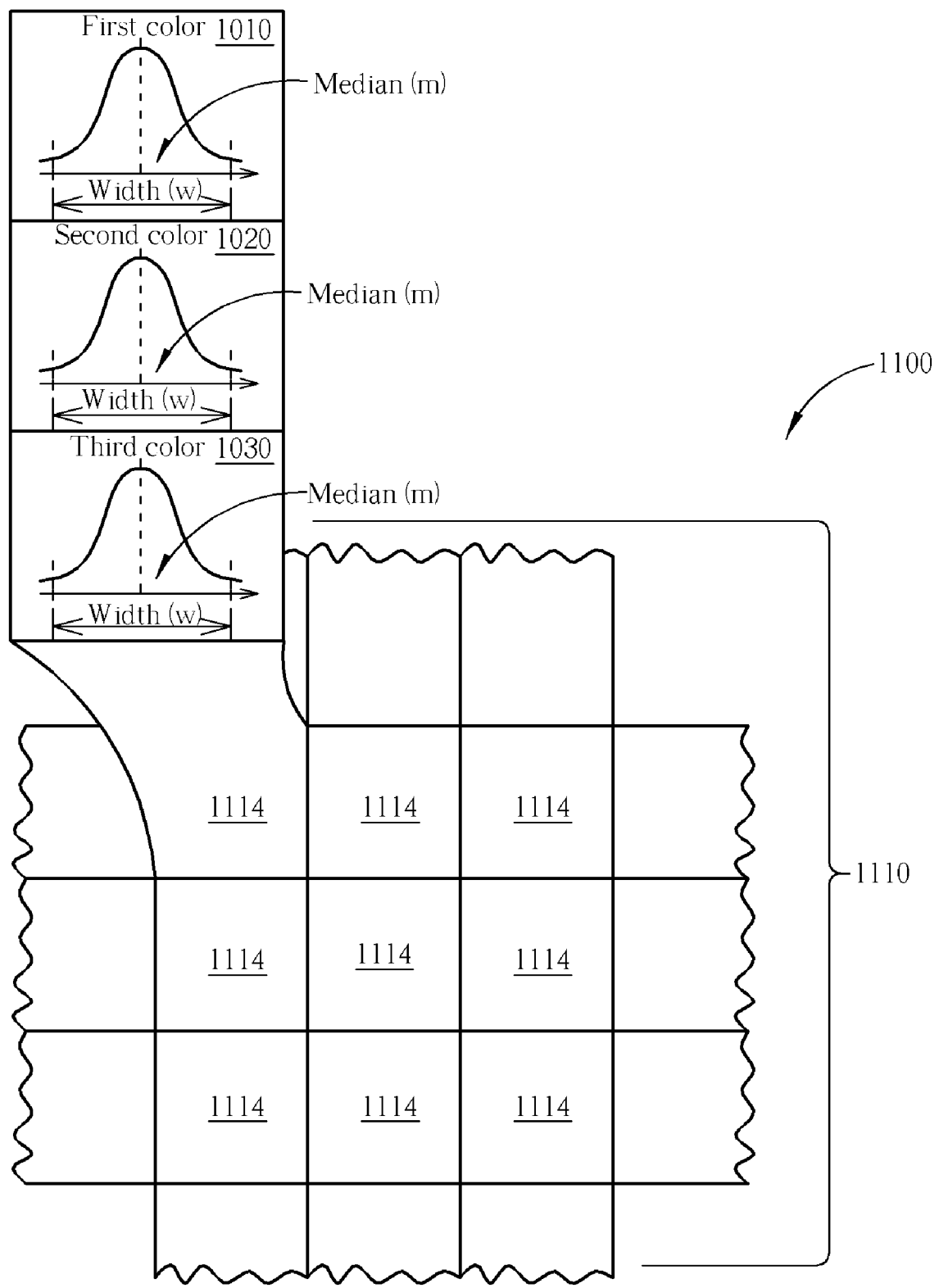
FIG. 5 illustrates an exemplary color feature map according to the method of FIG. 2.
Figure 10:
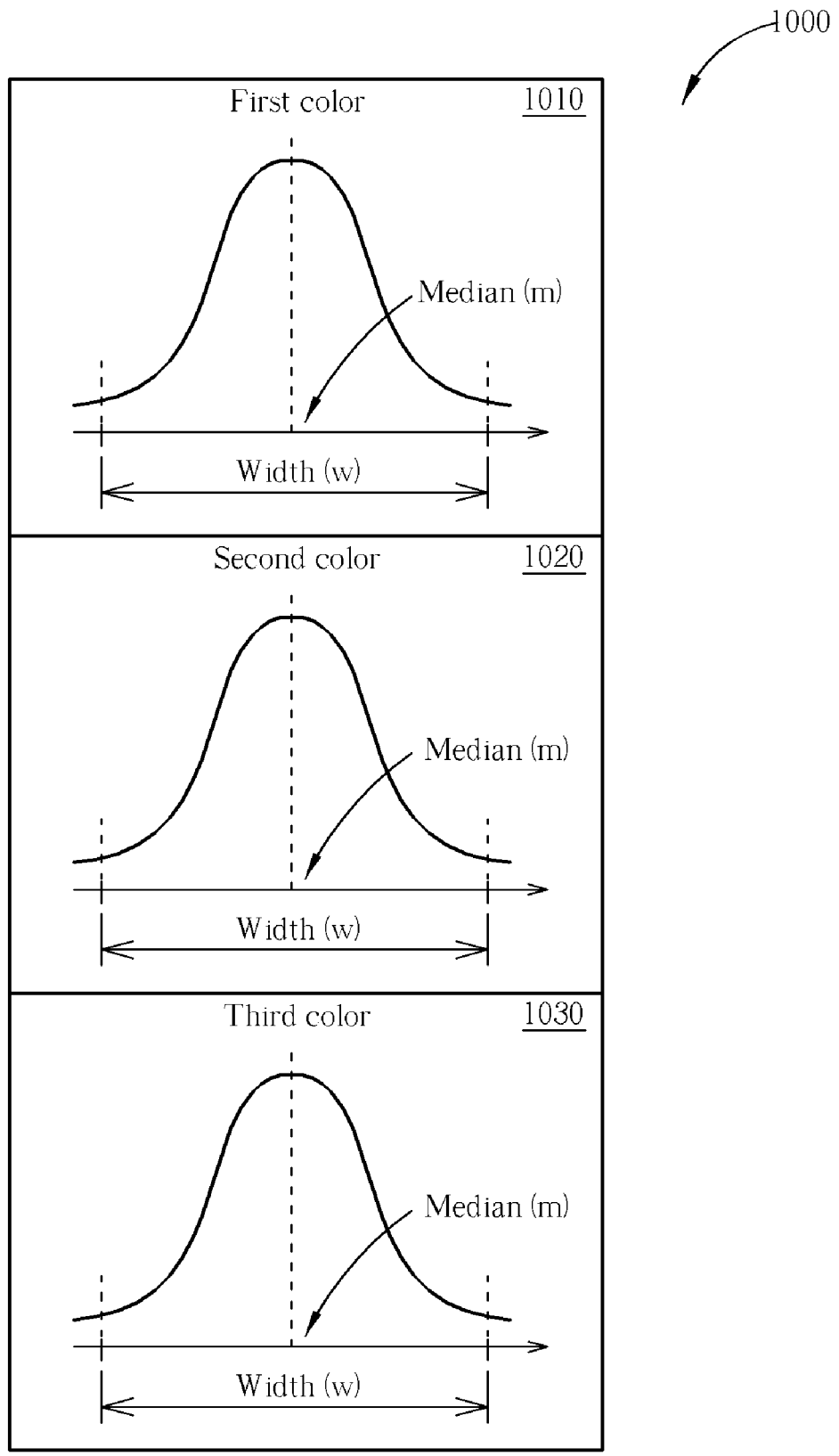
FIG. 10 illustrates color histogram data utilized in the color feature map generation step of the method of FIG. 2.

Color feature map generation 220 entails generating a color feature map containing color histogram data for each section of the image. An example of color histogram data is provided in FIG. 10 and an example of a color feature map is shown in FIG. 5. As shown in FIG. 10, each respective color comprises a width value, and a median value. In an embodiment of the present invention, each section comprises a width and median value for the color histogram for a first color 1010, a width and median value for the color histogram for a second color 1020, and a width and median value for the color histogram for a third color 1030. Additionally, the color histogram data can comprise red green blue (RGB) color histogram data. Utilizing the three colors (i.e., red, green, and blue) of an RGB color space as an example, the color histogram data for each section comprises a width of a color histogram for a first color, a median value of the color histogram for the first color, a width of a color histogram for a second color, a median value of the color histogram for the second color, a width of a color histogram for a third color, and a median value of the color histogram for the third color. As the extraction of color histogram data is well known to those familiar in the related art, further detail is omitted for brevity.

The color feature map, as shown in FIG. 5, shows an image 1110 divided into sections 1114. As briefly described above, and now illustrated in FIG. 5, each section 1114 contains color histogram data corresponding to each section from the image. The color histogram data can be in full-unedited form, including the width and median values for all colors, or in a more compact vector form, in accordance to a desired embodiment of the present invention.

Figure 6:
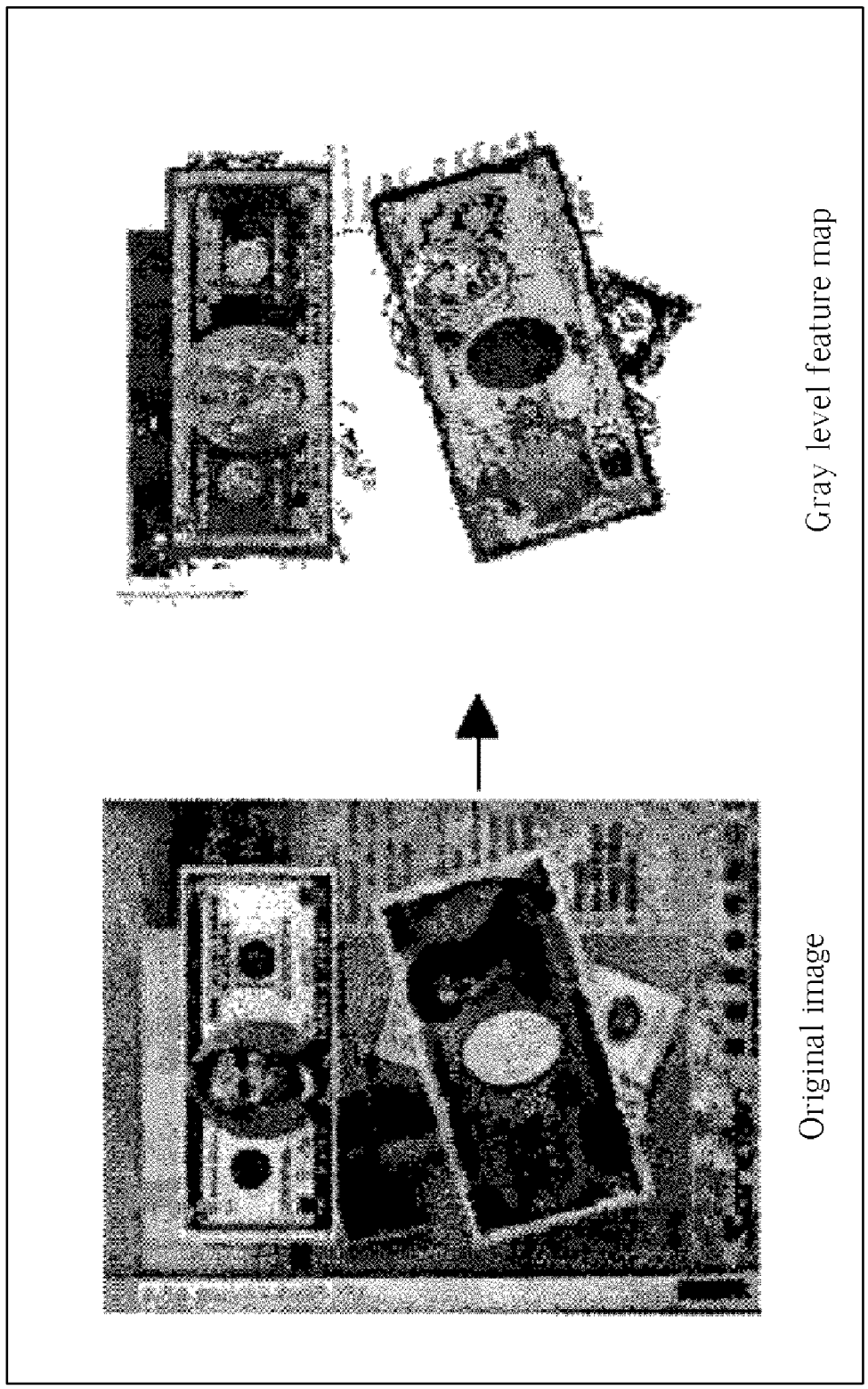
FIG. 6 illustrates a gray level texture feature map when utilizing the method of FIG. 2.

In gray level texture feature map generation 240, a gray level texture feature map is created that indicates a gray level value for each section of the image. An exemplary illustration is shown in FIG. 6. Each section in the image is thus analyzed and processed to determine a corresponding gray level for the section. As monetary banknotes typically possess a unique gray level variance within a specified range, this data will be used in later processes of boundary detection. Gray level analysis is well known to those involved in the related art, and therefore further discussion in this regard is omitted.

Figure 7:
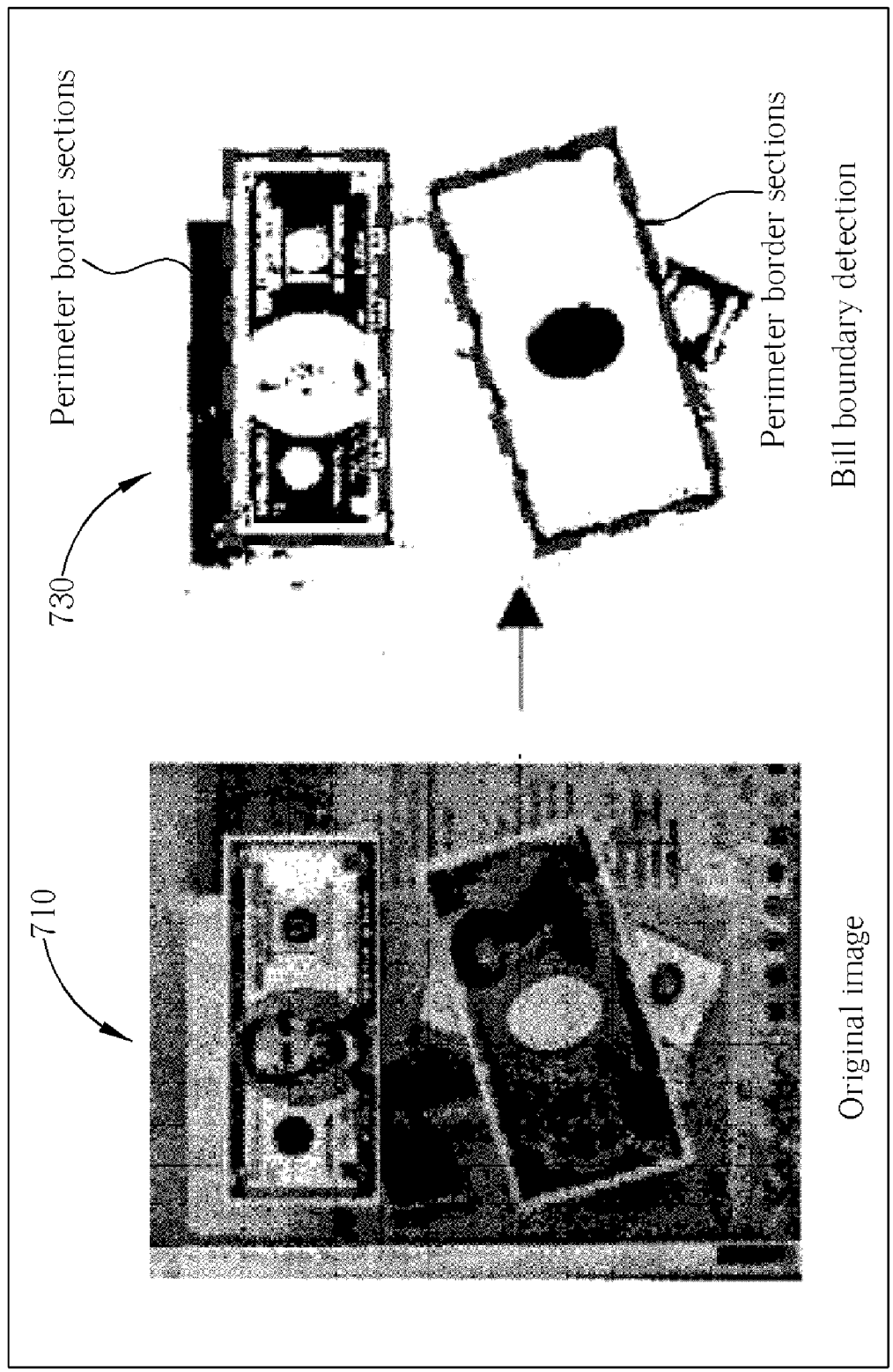
FIG. 7 illustrates generation of the banknote boundary map when utilizing the method of FIG. 2.

Banknote boundary map generation 250 is a pivotal step in which border sections are determined from data in the previous steps, primarily the color feature map, and the gray level texture feature map. In this step, sections having color histogram data within a first predetermined range, and also having gray level values within a second predetermined range, are identified as border sections and recorded onto the banknote boundary map. The first predetermined range is based on color histogram data for a border of a valid monetary banknote, while the second predetermined range is based on gray levels for a border of a valid monetary banknote. Therefore, as the predetermined ranges above are specifically tuned and chosen according to border information of a valid banknote, this step appropriately selects border sections using the correct criteria. This step is further illustrated in FIG. 7, showing an original image 710, and the sections meeting the criteria above selected as the border sections in the banknote boundary map 730.

Figure 1:
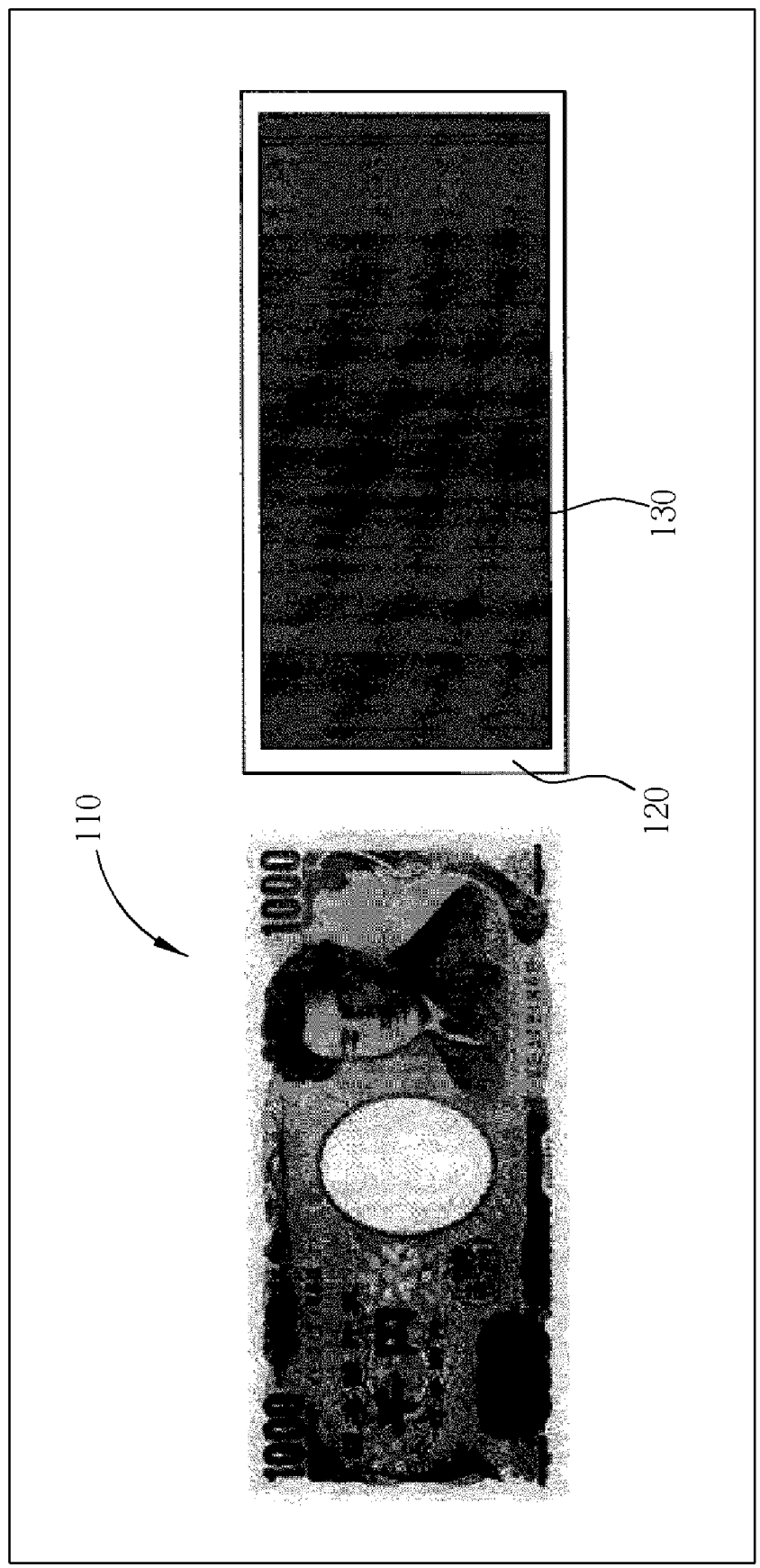
FIG. 1 shows a monetary banknote 110 according to the prior art.

Note from FIG. 1 that a border of a monetary banknote is unique and typically more transparent compared to the main body, resulting in different gray level and color histogram data than the main body. These may be some of the properties that are exploited in order to properly determine corresponding border sections. Accordingly, the predetermined ranges are chosen based on these characteristics in order to filter out and identify qualifying border sections.

Figure 8:
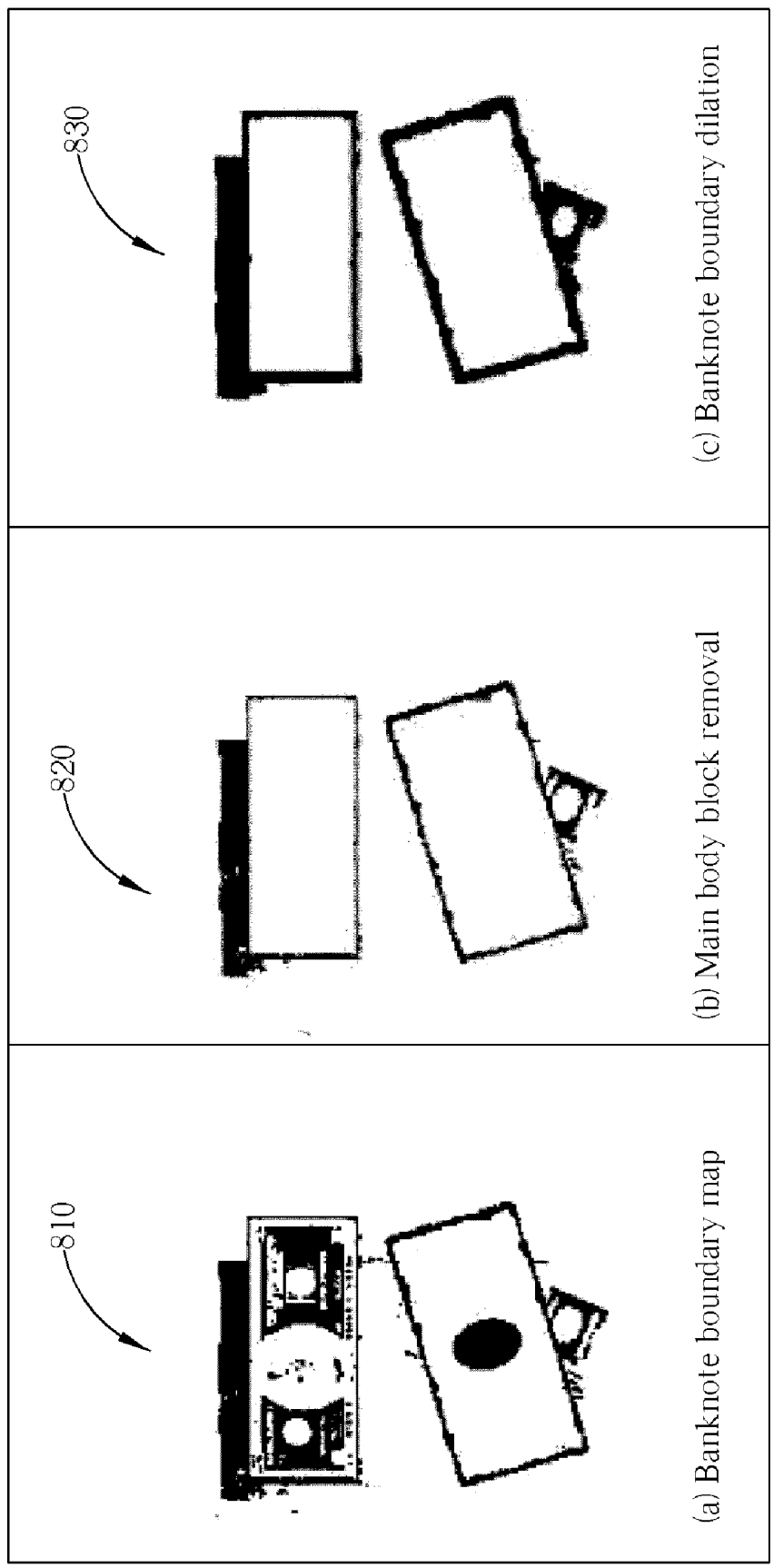
FIG. 8 illustrates the removal of internal border sections and dilation of the perimeter border sections in the banknote boundary map when utilizing the method of FIG. 2.

With border sections identified, the next step comprises banknote main body block removal 260. Note from FIG. 7 upon generating the banknote boundary map 730, the border sections comprise internal border sections enclosed by perimeter border sections. The internal border sections exist because, although the first and second predetermined ranges are tuned according to a valid banknote boundary, there may be sections within the boundary that meet the set criteria during banknote boundary map generation 250. As the internal border sections merely provide erroneous noise and data, they are not required and removed accordingly. FIG. 8 illustrates this step, showing an original banknote boundary map 810, followed by the removal of internal border sections in 820, resulting in only the perimeter border sections in the banknote boundary map.

Removal of the internal border sections enclosed by perimeter border sections can be conducted according to a number of criteria. In a preferred embodiment, the method can remove a number of internal border sections according to number of sections being greater than a threshold number. Additional embodiments may utilize removing internal border sections in the banknote boundary map such that the removed internal border sections correspond to a predetermined surface area.

The final step in the boundary detection method of the present invention involves banknote boundary dilation. This step is illustrated in FIG. 8 through banknote boundary dilation 830. This step is included because certain portions of the perimeter border sections may be very thin and not entirely connected by neighboring border sections. This characteristic may make it very difficult to distinguish the border of a certain banknote from surrounding or overlapping ones. Therefore, the perimeter border sections on the banknote boundary map are dilated to provide further clarity and resolution between banknotes.

Figure 4:
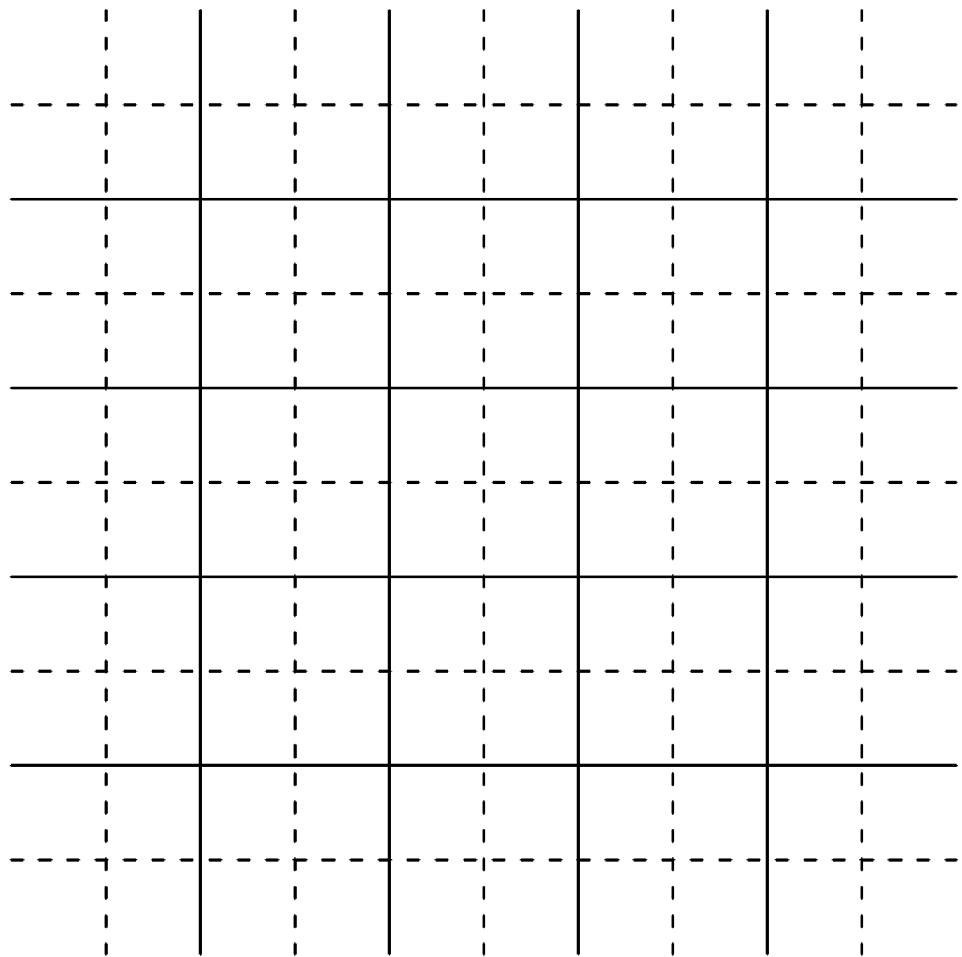
FIG. 4 illustrates an input image divided into overlapping sections when utilizing the method of FIG. 2.
Figure 9:
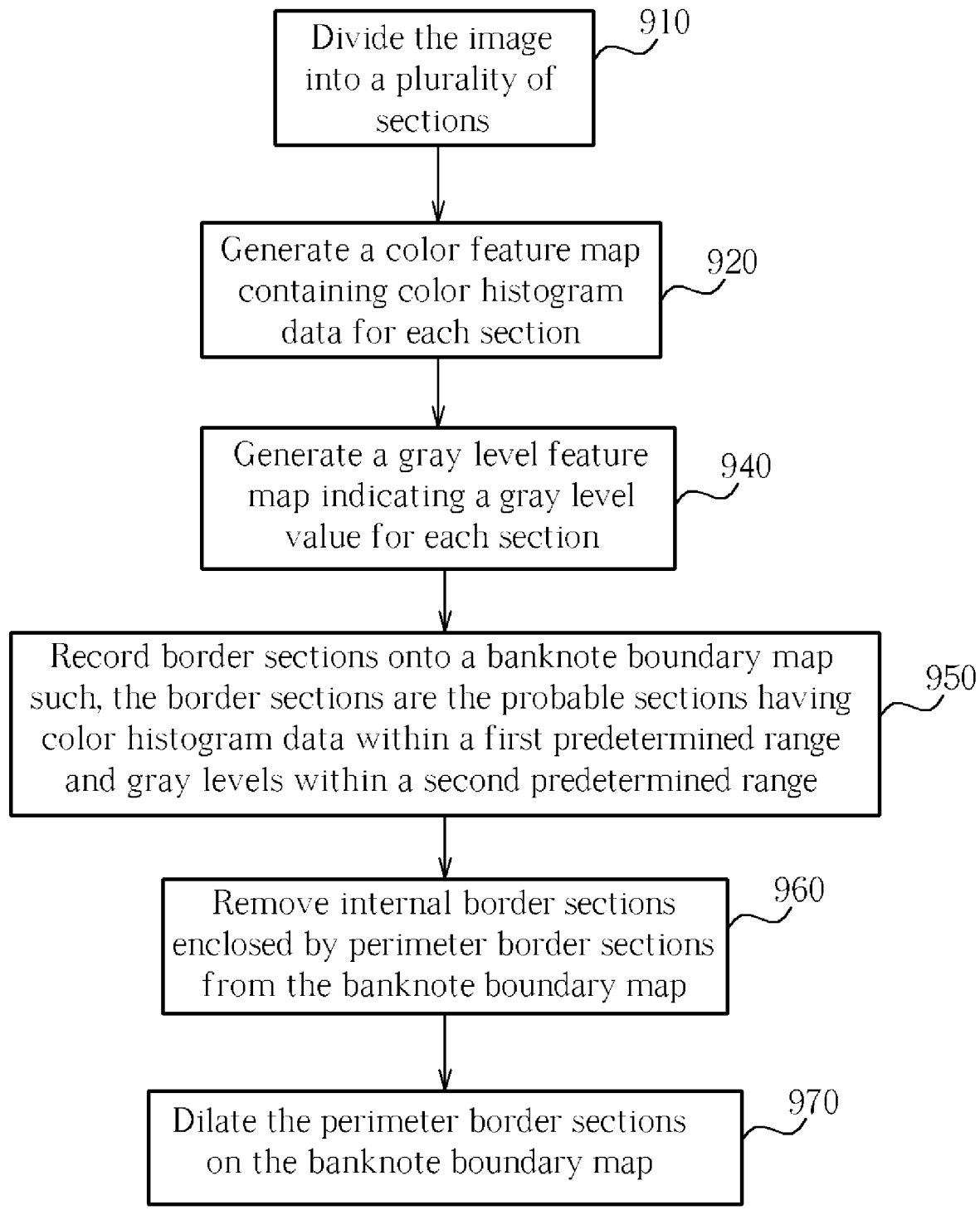
FIG. 9 is a process flow chart illustrating a method for detecting a boundary of a monetary banknote within an image according to an exemplary embodiment of the present invention.

A method for detecting a boundary of a monetary banknote within an image according to an exemplary embodiment of the present invention is additionally described in the process flow chart of FIG. 9. Provided that substantially the same result is achieved, the steps of the process 900 need not be in the exact order shown and need not be contiguous, that is, other steps can be intermediate. The boundary detection method comprises:

Step 910: Divide the image into a plurality of sections as shown in FIG. 3 or FIG. 4.

Step 920: Generate a color feature map as shown in FIG. 10 containing color histogram data for each section of the image.

Step 940: Generate a gray level feature map as illustrated in FIG. 6 indicating a gray level value for each section of the image.

Step 950: Record border sections onto a banknote boundary map such as shown in FIG. 7. Note that the border sections are the sections having color histogram data within a first predetermined range and gray level values within a second predetermined range. The predetermined ranges correspond to border sections of the desired valid monetary banknote.

Step 960: Remove internal border sections enclosed by perimeter border sections from the banknote boundary map as illustrated in FIG. 8.

Step 970: Dilate the perimeter border sections on the banknote boundary map as illustrated in FIG. 9.

By detecting a boundary of a monetary banknote within an image, the present invention provides a method to aid in the detection of counterfeit banknotes and currencies. Once the banknote boundary is detected, banknote verification techniques can be applied to the banknote main body. The banknote main body generally contains more distinguishing features which can therefore be identified for additional banknote verification processes.

Detection of a banknote boundary will also allow for the separation of multiple banknotes when on the same image scan. This will also help distinguish multiple banknotes if they are found overlapping or even on a complicated background.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting a boundary of a monetary banknote within an image, the method comprising:

dividing the image into a plurality of sections;

generating a color feature map containing color histogram data for each section of the image;

generating a gray level texture feature map indicating a gray level value for each section of the image;

recording border sections onto a banknote boundary map, the border sections being sections having color histogram data within a first predetermined range and gray level values within a second predetermined range, wherein, said border section comprises internal border section and perimeter border sections;

removing said internal border sections enclosed by said perimeter border sections from the banknote boundary map; and dilating the perimeter border sections on the banknote boundary map.

2. The method of claim 1 wherein the plurality of sections are a plurality of blocks.

3. The method of claim 1 wherein the sections are overlapping.

4. The method of claim 1 wherein the color histogram data for each section comprises a width of a color histogram for a first color, a median value of the color histogram for the first color, a width of a color histogram for a second color, a median value of the color histogram for the second color, a width of a color histogram for a third color, and a median value of the color histogram for the third color.

5. The method of claim 4 wherein the color histogram data is red green blue (RGB) color histogram data.

6. The method of claim 1 wherein the first predetermined range is determined according to color histogram data for a border of a valid monetary banknote.

7. The method of claim 1 wherein the second predetermined range is determined according to gray levels for a border of a valid monetary banknote.

8. The method of claim 1 wherein removing internal border sections enclosed by perimeter border sections from the banknote boundary map further comprises removing a number of border sections greater than a threshold number.

9. The method of claim 1 wherein removing internal border sections enclosed by perimeter border sections from the banknote boundary map further comprises removing a number of internal border sections corresponding to a predetermined surface area.

* * * * *